UNITED STATES PATENT OFFICE.

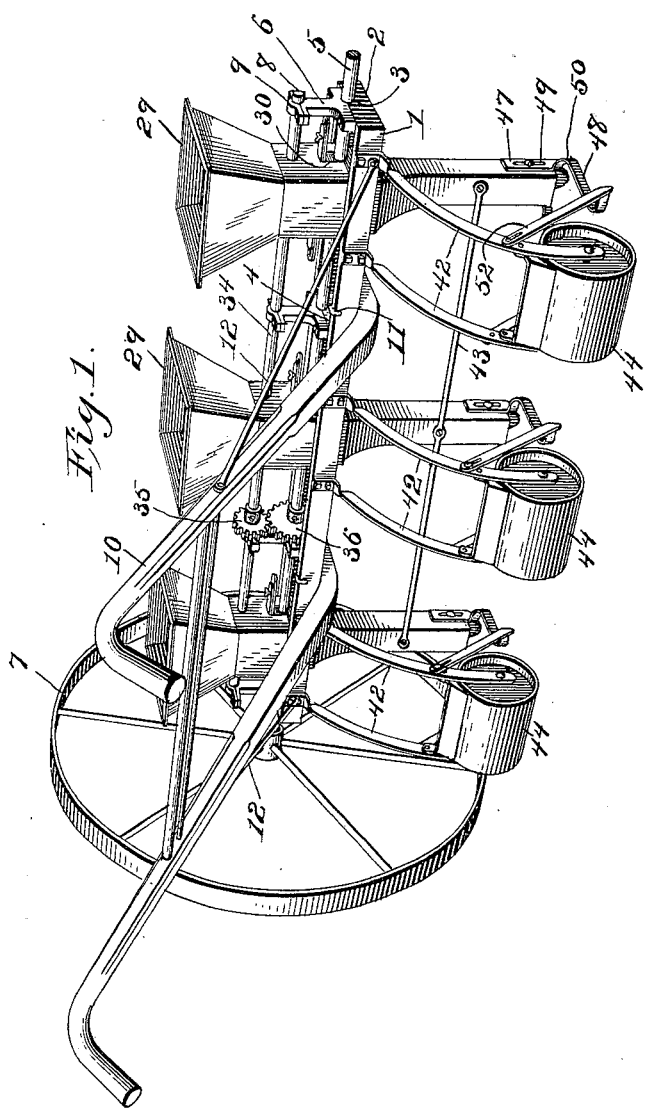

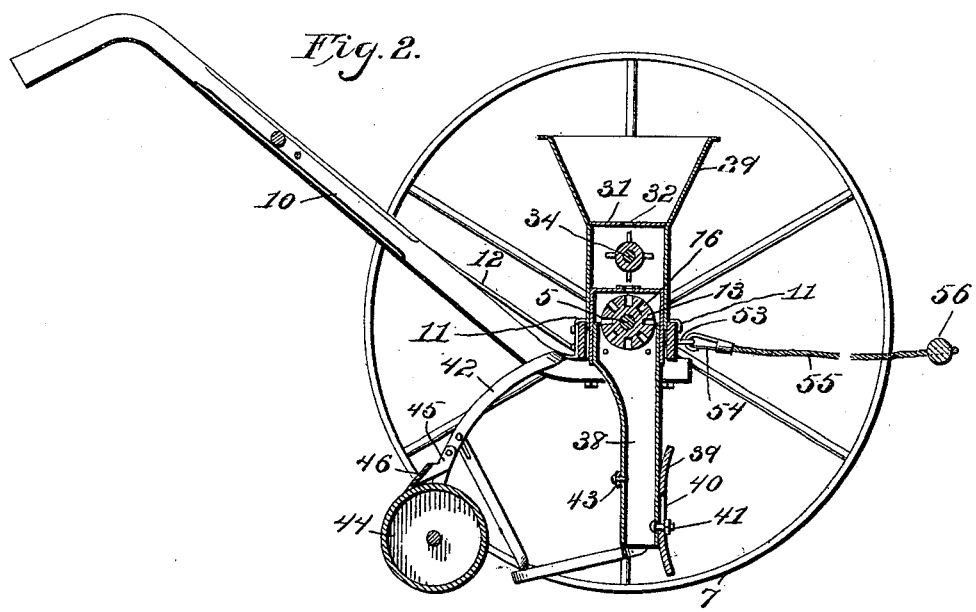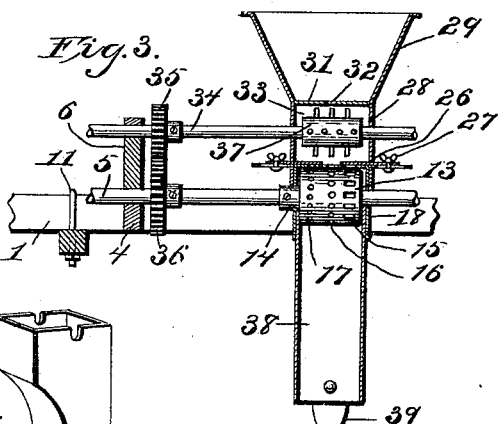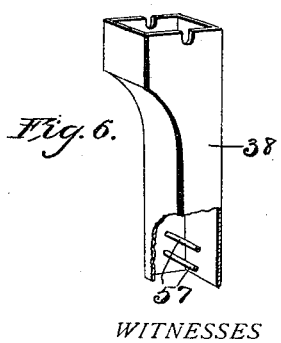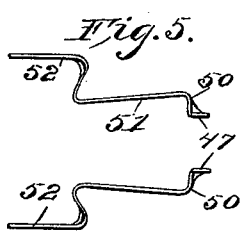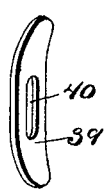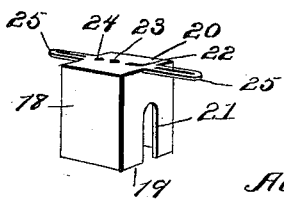

ALEXANDER T. FISCHER AND EDWIN C. LEWIS, OF DETROIT, MICHIGAN.

SEED-DRILL.

SPECIFICATION forming part of Letters Patent No. 643,050, dated February 6, 1900.

Application filed May 16, 1899. Serial No. 717,073. (No model.)

*To all whom it may concern:*

Be it known that we, ALEXANDER T. FISCHER and EDWIN C. LEWIS, citizens of the United States, residing at Detroit, in the county of Wayne and State of Michigan, have invented certain new and useful Improvements in Seed-Drills; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to seed-drills; and the purpose of the same is to accommodate sowing or planting of various kinds of seeds either in drills or hills by first opening up a furrow, dropping the seed, and then covering and rolling the same, the propulsion of the machine being carried on either manually or attached to a cultivator and operated by horse-power; also, to structurally improve devices of this character, so that they may be easily assembled and the several mechanisms readily positioned in relative operating proximity and including features of adjustment to regulate certain requirements in sowing or planting particular seeds or grain; further, to lighten the construction to such an extent as to adapt the drill to be drawn by manual power and permit the use of the device for garden-work or planting on small tracts or in such places as are confined and where a draft-animal could not be conveniently used.

The invention consists, primarily, of a frame having hoppers and boots arranged in separable parts adapted to be assembled in sequence and one fitted in the other over portions of an operating-shaft carrying seed-distributing cylinders and also containing agitators on a second shaft actuated by the first, the agitators being positioned above feed-caps located within the hoppers and over the distributing-cylinders and provided with adjustable slides to regulate the opening and closing of certain openings in alinement with openings of corresponding dimensions in the several distributing-cylinders.

The invention further consists of a frame of rectangular contour having end and intermediate bearings and adapted to receive hoppers and boots made in separable parts and also operating and agitating shafts, the boots and hoppers being of such relative dimensions as to snugly fit the frame in a manner that will accommodate a ready assemblage or disconnection, and thus facilitate the structural erection of the machine or separation for shipment or storage without requiring the services of a skilled mechanic.

The invention further consists of a frame comprising hoppers and boots, with opening-shovels adjustably mounted thereon and of a specific form, and rear covering-rollers fitted in bracket-frames and having braces shiftably connected thereto and also to coverers that have portions of the same movably attached to the boots.

The invention further consists of the details of construction and arrangement of the several parts, which will be more fully hereinafter described and claimed.

In the accompanying drawings, Figure 1 is a perspective view of a seed-drill embodying the invention. Fig. 2 is a longitudinal vertical section of the same. Fig. 3 is a transverse vertical section of a part of the device. Fig. 4 is a detail perspective view of one of the seed-regulating caps located in the hoppers. Fig. 5 is a detail top plan view of the coverers and braces. Fig. 6 is a detail view of one of the boots, showing a modification in the construction. Fig. 7 is a detail view of one of the adjustable shovels which are applied to the boots.

Referring to the drawings, wherein similar numerals are employed to indicate corresponding parts in the several views, the numeral 1 designates a frame which is of elongated rectangular form, open at top and bottom and closed on opposite sides and ends. The opposite ends 2 have semicircular recesses 3 in the center of the upper edges thereof, and between the said ends at suitable intervals cross-bearings 4 are included with or form a part of the said frame and also have semicircular recesses in the upper edges. The main driving or operating shaft 5 is mounted in the several semicircular recesses in the ends of the frame and the cross-bearings 4, and thereover are placed journal-bearings 6, which have their lower edges recessed and are bolted firmly in position. On the ends of the said main driving or operating shaft 5 ground-wheels 7 are carried and may be of any suitable or preferred form. The journal-bearings 6 have upper recessed heads 8, adapted to receive caps 9, and it is preferred that the said bearings, as well as the recesses in the ends of the frame and cross-bearings 4, be babbitted or provided with any lubricating attachment that may be found necessary and best adapted for the purpose.

To the frame 1 handles 10 are attached by hook-bolts 11 and rigidly supported by braces 12, running therefrom and to points adjacent the ends of said frame.

The main driving or operating shaft 5 has seed-distributing cylinders 13 secured thereto at regular intervals and more clearly shown in Figs. 2 and 3. As shown in Fig. 3, each cylinder is preferably provided with a sleeve 14, which is made fast to the shaft 5 by a set screw or bolt, and circumferentially surrounding each cylinder in regular order are series of pockets 15, 16, and 17, the pockets 15 being the largest and adapted to receive coarse seeds or grain. The pockets 16 are smaller than pockets 15, and the dimensions of the pockets 17 are still less than the pockets 16. By this means the cylinders can be utilized for planting or sowing seeds or grain of various kinds, and over each cylinder a regulating-cap 18 is mounted and has an open bottom 19 and closed top 20. In opposite ends slots 21 are formed in the said regulating-cap and fit downwardly over the shaft 5 and the sleeve 14 at the end of the cylinder 13. The closed top 20 of each cap has apertures 22, 23, and 24 in transverse alinement therein, which are of a size similar to the pockets 15, 16, and 17, respectively, in the cylinder 13. These apertures 22, 23, and 24 are located directly over the pockets of the cylinder when the cap is in position, and to provide means for opening or closing the said apertures each cap has outwardly-projecting arms 25 at the top, with slots therethrough to movably receive slides 26, having thumb adjusting-nuts or analogous devices 27 and movable at the will of the operator from the exterior of each hopper. Two of these slides 26 are used with each distributing-cap, and by shifting the same any one of the apertures 22, 23, and 24 may be opened and the others remain closed, or, if desired, two or all of the said apertures may be opened or shut off.

Each distributing-cylinder has a cap 18 positioned thereover, and on the said caps the depending tubular legs 28 of feed-hoppers 29 are positioned, the said legs having their opposite ends near the bottom also formed with slots 30 to embrace the shaft 5, the slides 26, and the arms 25. The legs 28 of the hoppers depend a short distance below the distributing-cylinders 13, as clearly shown in Figs. 2 and 3, and are closely confined between the opposite sides of the frame 1. Between the legs 28 and the upper flaring portions of each hopper 29 horizontal partitions 31 are located, having central apertures 32, and these partitions form the upper limit of compartments 33 over the regulating-caps. Each hopper is similarly constructed, and in the upper heads 8 of the journal-bearings 6 and confined in position by the caps 9 an agitating-shaft 34 is rotatably mounted and extends through the compartments 33 of the hoppers. This shaft 34 has a toothed or cog wheel 35 mounted thereon, which meshes with a similar wheel 36 of larger dimensions on the shaft 5, and within each compartment 33 on the agitating-shaft an agitator 37 is fixed and comprises a cylindrical body having a series of radially-extending teeth. These agitators stir up the seed coming through the partitions 31 into the compartments 33 and prevent clogging over the regulating-caps 18 and insure a continuous and uniform feed.

Fitted into the lower portion of each leg 28 is a boot 38, which depends a considerable distance below the frame 1, and at its upper end, where it fits the said leg, is slightly smaller than the latter to provide a snug joint, and is reduced at its lower portion, so as to centralize the seed or grain dropping therethrough. The upper portions of the opposite ends of each boot are also slotted to embrace the shaft 5 or the sleeve 14 of the distributing-cylinder 13 at one end and the said shaft at the other end, and when the parts are thus arranged the opposite ends of the cylinder are movably embraced by the upper end of the boot.

The boot, regulating-cap, and leg of the hopper in each instance are all secured to each other and to the frame 1 at their point of juncture by suitable means, preferably by bolts that can be removed and are not shown, as any means of securement can be utilized, and therefore this is not particularly essential. On the front lower portion of each boot 38 a shovel 39 is adjustably mounted and has a slot 40 therein to receive a clamping-bolt 41 for the purpose of regulating the depth of penetration of the lower end of said shovel, and which is more clearly shown in Fig. 7. The purpose of this shovel is to open a furrow in advance of the boot to receive the seed or grain being sown or planted.

To the rear part of the frame 1, just behind the location of the hoppers and boots, a pair of bracket-arms 42 are secured and spaced apart from each other, the said arms curving downwardly and rearwardly and having apertures in their lower ends. Between the lower ends of the arms 42 rollers 44 are mounted, and movably attached to said arms are the arms 45 of scrapers 46, which clean the several rollers and cause the removed material to drop on the row behind each roller. To the opposite ends of the lower portions of the boots vertical members 47 of coverers 48 are adjustably attached by having slots 49 formed therein to receive bolts seated in the said boots. These members 47 are disposed vertically, and the coverers 48 extend rearward from the lower ends thereof, being curved first outwardly, as at 50, and then rearwardly at a slight divergent angle, as at 51, and then outwardly, where they connect with inclined braces 52, adjustably attached to the arms 42. These coverers stand in advance of the rollers 44 and slightly beyond opposite ends, the bends of the said coverers, as shown by Fig. 5, being slightly inclined or disposed at an inward angle to more effectively push inward and gather the loose soil over which they travel.

To the front side of the frame 1, at opposite points, rings or eyes 53 are secured, and thereto are adapted to be removably applied snap-hooks 54 on the rear ends of opposite pull cords or ropes 55, attached at their front ends to a cross or hand bar 56. The purpose of this attachment is to permit one operator to pull the machine from the front side, another guiding it from the rear, and thus accommodate a manual operation of the device. It will be understood, however, that the drill can be attached to the rear of a cultivator, and in some instances this will be especially desirable. It will be understood that by the connection of the drill to the rear of a harrow, for instance, or a gang-cultivator the two kinds of work—viz., preparing and sowing or planting—can be carried on in rapid succession and at substantially one operation.

In the use of the cords or ropes 55 and the cross or hand bar 56 the operator stands between the cords or ropes and in rear of the bar, and either pushes forwardly on the latter or rests it against his breast to obtain a greater pressure.

The seed or grain to be sown or planted is placed in the several hoppers and feeds down through the openings 32 in the partitions 31. The slides 26 are adjusted to uncover the aperture in the cap 18, which is of a size relative to the grain or seed to be sown or planted. Previous to this adjustment of the slides, however, or after cessation of operation of the machine they may be entirely closed over the several apertures in the caps, so that none of the grain or seed will be lost or wasted, and the drill can then be transported from one place to another. In operation the seed or grain passes through the uncovered apertures in the caps 18 and into the line of pockets in the distributing-cylinders 13, registering therewith, and from said cylinders downward through the boots 38 into the furrow which has been opened up by the shovels 39, and coverers 48 behind the boots will draw the loose soil inwardly over the open furrow, and said soil is subsequently packed down by the rollers 44 in the rear. As the machine is propelled forwardly by either of the methods specified the shaft 5 is revolved and, through the toothed wheels 36 and 35, the shaft 8 is proportionately rotated, and the several cylinders and agitators are revolved in unison and with equal regularity.

In Fig. 6 the boot is shown provided with cross rods or pins 57 for the purpose of spreading the seed or grain and delivering it from the lower end of the boot in such a manner that it will be distributed over a large surface. This form of boot will be used at times and is particularly adapted for certain kinds of grain or seed. It will also be observed that the distributing-cylinders will feed the seed or grain into the boots in such manner as to produce a continuous sowing or dropping at regular intervals in hills, and this will be dependent upon the nature of the seed and the requirements of sowing or planting the same. To give constancy of space and rigidity to the boots 38, they are braced by a rod 43, extending across the rear of and secured to same.

Three hoppers and complementary parts therefor are shown in the drawings; but it is understood that this number may be modified and the same construction carried out.

It is preferred that the parts be made of metal, the hoppers, regulating-caps, and boots of suitable sheet metal having sufficient rigidity.

Changes in the proportions, dimensions, and minor details of construction may also be resorted to without in the least departing from the nature or spirit of the invention or sacrificing any of the advantages thereof.

Having thus described the invention, what is claimed as new is—

1. In a seed-drill, the combination of a frame, hoppers, boots and regulating-caps in separable parts and fitted in said frame, agitating and distributing devices for said hoppers, rollers connected to the frame in rear of the boots, and coverers between the boots and rollers and having bends disposed at an inward angle as and for the purpose specified.

2. In a seed-drill, the combination of a frame, a drive-shaft extending thereover and having distributing-cylinders thereon at regular intervals, each provided with pockets of varying dimensions, caps with varying apertures corresponding with the size of the pockets in the cylinders, and slides operatively connected therewith means for regulating the supply of seed or grain to the said cylinders, hoppers and boots in intimate relation to the cylinders, and means for rotating said cylinders.

3. In a seed-drill, the combination of a frame, a drive-shaft extending thereover, a series of distributing-cylinders on the said drive-shaft, each having pockets therein of varying dimensions, apertured caps and slides operatively connected therewith and means for supplying the grain or seed to the said cylinders and conveying it away therefrom.

4. In a seed-drill, the combination of a series of hoppers, a drive-shaft extending therethrough and having distributing-cylinders thereon with pockets therein of varying dimensions, regulating-caps fitted over the said cylinders and having apertures in the top thereof corresponding in size to the pockets in the cylinders, slides operatively connected with said caps for uncovering or covering the said apertures in the pockets, and means for conveying the seed or grain away from the cylinders.

5. In a seed-drill, the combination of a frame, a drive-shaft extending thereover having distributing-cylinders thereon provided with pockets of varying dimensions, hoppers and boots fitted in the frame above said cylinders, caps mounted over the cylinders and located within a part of the hoppers, said caps being provided with apertures in the upper portions thereof, corresponding in size to the pockets in said cylinders, an agitating-shaft extending through the lower portion of the hoppers and having agitators thereon above the caps, and slides for regulating the apertures in the caps.

6. In a drill, the combination with seed or grain distributing devices, of rollers in rear thereof, and adjustable coverers in advance of the rollers and having a lateral extension greater than the width of said rollers and arms attached to said coverers and adjustably connected with the arms supporting the rollers.

7. In a grain-drill, the combination of a frame, having a series of hoppers therein, and boots extending from said hoppers, distributing devices within the hoppers, rollers in rear of the boots, shovels adjustably attached to the lower front portion of the boots, and coverers in advance of the rollers, adjustably connected to the supports for said rollers and to the boots, and having bends disposed at an inward angle, substantially as and for the purpose specified.

8. In a drill, the combination of a frame having end and intermediate journal-bearings, a drive-shaft fitted in a part of said frame and said bearings, an agitator-shaft in the upper part of the bearings, hoppers through which the agitator-shaft extends and fitted over the drive-shaft, distributing-cylinders on the drive-shaft having pockets therein of varying dimensions, regulating-caps within the lower portion of the hoppers and over the distributing-cylinders and provided with top apertures corresponding in size to the pockets in the cylinders, agitators on the agitator-shaft and within the hopper above the caps, slides for regulating the apertures in the caps, boots depending from the hoppers and having shovels adjustably connected to the lower portions thereof, and covering devices in rear of the boots.

9. In a drill, the combination with a frame, hoppers and boots, of bracket-arms extending rearwardly from the frame, rollers mounted in said arms and coverers adjustably connected to the boots and bracket-arms for the rollers and projecting laterally a distance greater than the length of the rollers and having inclined bends as and for the purposes specified.

10. In a seed-drill, the combination with hoppers and boots, of a shaft having distributing-cylinders thereon provided with pockets varying in dimensions, and caps mounted over said rollers, having regulable apertures in the top thereof, which aline with the pockets in the cylinders and slides operatively mounted on said caps.

In testimony whereof we affix our signatures in presence of two witnesses.

ALEXANDER T. FISCHER.
EDWIN C. LEWIS.

Witnesses:
HERMANN KAUFMANN,
JOSEPH F. KAUFMANN.